(12) United States Patent
O'Connor

(10) Patent No.: US 8,657,946 B2
(45) Date of Patent: Feb. 25, 2014

(54) POLYMERIC MATERIAL OF PHOTOSYNTHETIC ORIGIN COMPRISING PARTICULATE INORGANIC MATERIAL

(75) Inventor: Paul O'Connor, Hoevelaken (NL)

(73) Assignee: KiOR, Inc., Pasadena, TX (US)

( * ) Notice: Subject to any disclaimer, the term of this patent is extended or adjusted under 35 U.S.C. 154(b) by 992 days.

(21) Appl. No.: 12/299,320

(22) PCT Filed: May 4, 2007

(86) PCT No.: PCT/EP2007/054377
§ 371 (c)(1),
(2), (4) Date: Nov. 3, 2008

(87) PCT Pub. No.: WO2007/128799
PCT Pub. Date: Nov. 15, 2007

(65) Prior Publication Data
US 2010/0204378 A1    Aug. 12, 2010

(30) Foreign Application Priority Data

May 5, 2006  (EP) ..................................... 06113563
May 5, 2006  (EP) ..................................... 06113581

(51) Int. Cl.
| | | |
|---|---|---|
| C08L 97/02 | (2006.01) | |
| C09D 197/02 | (2006.01) | |
| C09J 197/02 | (2006.01) | |
| C08K 3/34 | (2006.01) | |
| C09K 3/10 | (2006.01) | |
| C08K 9/04 | (2006.01) | |
| B60C 1/00 | (2006.01) | |

(52) U.S. Cl.
USPC ...... 106/164.01; 524/444; 524/445; 524/450; 524/492

(58) Field of Classification Search
USPC ............... 524/445, 444, 450, 492; 106/164.3, 106/164.01
See application file for complete search history.

(56) References Cited

U.S. PATENT DOCUMENTS

| | | | | |
|---|---|---|---|---|
| 3,436,357 | A | * | 4/1969 | Rosinski et al. ................ 502/65 |
| 4,323,494 | A | * | 4/1982 | Blount .......................... 524/858 |
| 2002/0014209 | A1 | * | 2/2002 | Bloomer ...................... 119/172 |
| 2004/0185201 | A1 | * | 9/2004 | Pinnavaia et al. ............. 428/36.1 |
| 2005/0051054 | A1 | | 3/2005 | White et al. |

FOREIGN PATENT DOCUMENTS

| | | |
|---|---|---|
| CA | 1123774 A1 | 5/1982 |
| CA | 1163595 A1 | 3/1984 |
| WO | 01/34725 A | 5/2001 |
| WO | WO 01/34725 * | 5/2001 |
| WO | 02/14040 A1 | 2/2002 |

OTHER PUBLICATIONS

Milone et al., Ind. Eng. Chem. Res. 2010, 49, 3242-3249.*
Dobele G et al: "Application of Catalysts for Obtaining 1,6-Anhydrosaccharides From Cellulose and Wood by Fast Pyrolys", Journal of Analytical and Applied Pyrolysis, Amsterdam NL, vol. 74 No. 1-2, Aug. 2005, pp. 401-405, XP004913640, ISSN: 0165-2370, Paragraphs [02.1]-[02.3].
Marques et al: "Titanium dioxide/Cellulose Nanocomposites Prepared by a Controlled Hydrolysis Method" Composites Science and Technology, Elsevier, vol. 66 No. 7-8, Jun. 2006, pp. 1038-1044, XP005334223, ISSN: 0266-3538, The Whole Document.
Liu et al: "Preparation, Characterization and Mechanical Properties of Epoxidized Soybean Oil/Clay Nanocomposites", Polymer, Elsevier Science Publishers B.V., GB, vol. 46. No. 23, Nov. 14, 2005, pp. 10119-10127, XP005115589, ISSN: 0032-3861, Paragraph [0002].
Ruan Dong et al: "Structure and Properties of CDS/Regenerated Cellulose Nanocomposites", Macromol. Mater.Eng.; Macromolecular Materials and Engineering Oct. 20, 2005, vol. 290 No. 10, Oct. 20, 2005, pp. 1017-1024, XP002407767, The Whole Document.
Yoshioka Mariko et al: "Newly Developed Nanocomposites From Cellulose Acetate/Layered Silicate/Poly(Epsilon-Caprolactone): Synthesis and Morphological Characterization", J. Wood Sci.; Journal of Wood Science Apr. 2006, vol. 52, No. 2 Apr. 2006, pp. 121-127, XP002407768 p. 122-p. 123.
Lin et al, "Catalytic Conversion of Commingled Polymer Waste Into Chemicals and Fuels Over Spent FCC Commercial Catalyst in a fluidised-Bed Reactor" Applied Catalysis B: Environmental, ELSEVIER, vol. 69, (2007) pp. 145-153.
Hulet, et al, "A Review of Short Residence Time Cracking Processes", International Journal of Chemical Reactor Engineering, Berkeley Electronic Press, Berkeley, CA, US, vol. 3, 2005, pp. 1-72.

* cited by examiner

*Primary Examiner* — Angela C Scott
(74) *Attorney, Agent, or Firm* — Hovey Williams LLP

(57) ABSTRACT

Disclosed is a new composition of matter comprising a polymeric material of photosynthetic origin having embedded therein small particles of an inorganic material. The composition of matter is particularly suitable for use in processes whereby the polymeric material is converted to fuels in liquid or gas form, and/or to the valuable specialty chemicals. The polymeric material comprises biomass. More specifically, the polymeric material comprises cellulose and at least one of hemicellulose and lignin.

24 Claims, 3 Drawing Sheets

POLYMERIC MATERIAL OF PHOTOSYNTHETIC ORIGIN COMPRISING PARTICULATE INORGANIC MATERIAL

BACKGROUND OF THE INVENTION

1. Field of the Invention

The present invention relates to a new composition of matter comprising a polymeric material of photosynthetic origin having embedded and/or occluded therein small particles of an inorganic material. The invention further relates to methods for making these compositions.

The composition of matter is particularly suitable for use in processes whereby the polymeric material is converted to fuels in liquid or gas form, and/or to valuable specialty chemicals.

Said compositions are particularly more susceptible to depolymerization, defibrillation and/or decomposition.

The polymeric material comprises biomass. More specifically, the polymeric material comprises cellulose and at least one of hemicellulose and lignin. Preferably the material comprises all three of cellulose, hemicellulose, and lignin.

2. Description of the Related Art

Polymeric materials of photosynthetic origin are produced in large volumes in agriculture and forestry. Many of these materials are intended for use as food products for human consumption, in animal feed, or other forms of valuable materials. For example, forestry products are used as construction materials in the form of lumber, plywood, paper and paper products and paper byproducts and the like.

Incidental to the production of agricultural and forestry products, the world produces vast quantities of agricultural and forestry waste. Examples include wood chips, saw dust, straw, corn husks, bagasse, and the like. Attempts have been made to convert these waste materials to useful products. In general, these waste materials are converted to products of low intrinsic value, such as compost. Attempts to convert these materials to products of a higher value have met with limited success. For example, conversion of agricultural waste to ethanol by fermentation is a time-consuming and expensive process. Moreover, even the most sophisticated fermentation enzymes are only able to convert at most about 50 percent of the available material. The remaining 50 percent is immune to attack by fermentation enzymes and is sometimes referred to as "recalcitrant cellulose" for this reason.

It is an object of the present invention to provide a new composition of matter that can be made from agricultural or forestry products, or waste materials from agriculture and forestry, and that is more easily converted to liquid or gaseous fuel or to specialty chemicals than the waste materials from which it is derived. It is a further object of the present invention to provide processes for preparing the new composition of matter.

BRIEF SUMMARY OF THE INVENTION

The present invention relates to a composition of matter comprising a polymeric material of photosynthetic origin having embedded therein small particles of an inorganic material. More specifically, the polymeric material of photosynthetic origin comprises cellulose, hemicellulose, and/or lignin.

In a specific embodiment, the polymeric material comprises biomass. As used herein the term "biomass" refers to materials produced by non-aquatic plants and comprising cellulose, hemicellulose, and/or lignin.

The inorganic material may be inert, for example a salt of an alkali metal or alkaline earth metal. In an alternate embodiment, the inorganic material may have catalytic activity. Examples include clays, silicas, silica aluminas, zeolites, anionic clays, cationic layered materials, metal hydroxyl salts and the like. The carbonates and hydroxides of alkali metals, and the hydroxides, carbonates and oxides of earth alkali metals are also suitable for use in the present invention. Preferably the inorganic material is compatible with soil used for growing plants, so that waste material may be disposed of by mixing it with soil. For this reason the salts, oxides and hydroxides of rare earth metals, although suitable for use as the particulate inorganic material in the compositions of the present invention, are less preferred.

DESCRIPTION OF ILLUSTRATIVE EMBODIMENTS

Figure 1:
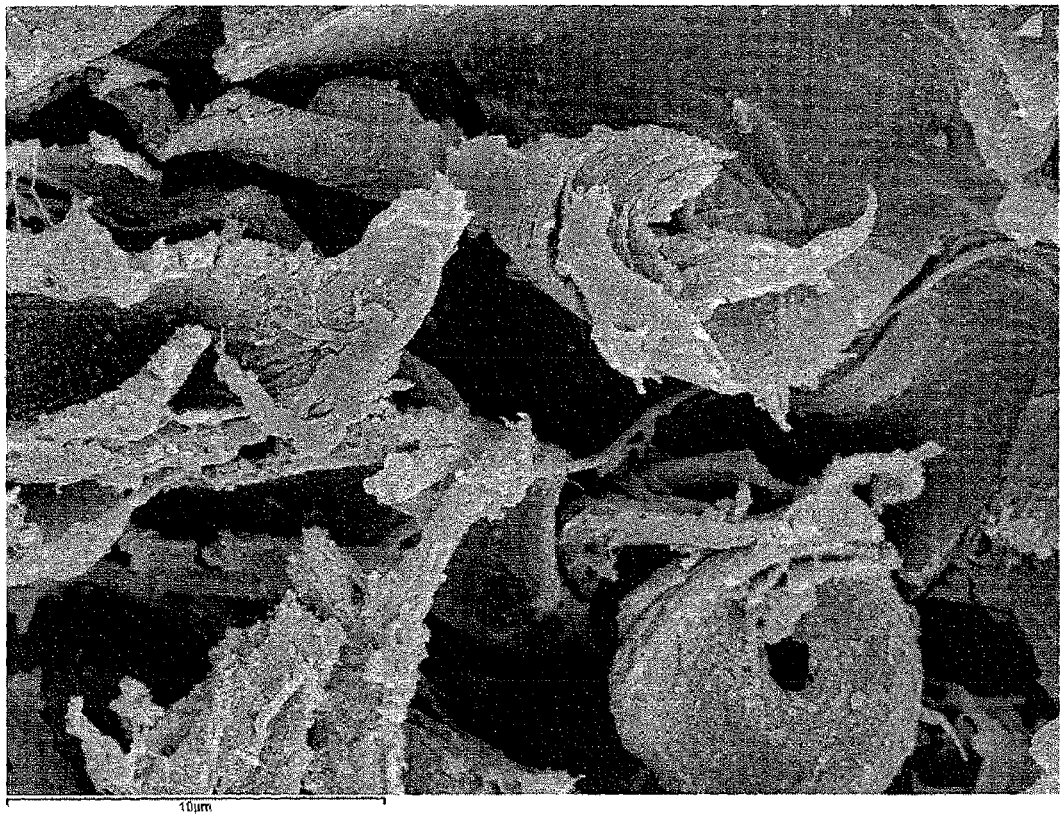
FIG. 1 is a SEM picture of a wood sample that has been ground and heated in water.

The following is a description of certain embodiments of the invention, given by way of example only.

The present invention is based on the discovery that certain polymeric materials of photosynthetic origin can be made more susceptible to defibrillation, pillaring, decomposition and depolymerization by converting them to a new composition of matter comprising the polymeric materials and having embedded therein small particles of an inorganic material.

Suitable for use in the present invention are polymeric materials comprising biomass, in particular polymeric materials comprising cellulose and at least one of hemicellulose and lignin. Most preferred are polymeric materials comprising cellulose, hemicellulose, and lignin.

The term biomass, as used herein, is a material of plant origin, containing a significant amount of cellulose and at least one of hemicellulose and lignin. In general, biomass is a material produced by the photosynthetic conversion in plants of carbon dioxide and water under the influence of solar energy. The plants that are the origin of the biomass are land-based. Aquatic plants contain little or no cellulose and are not considered suitable for the purpose of the present invention. Examples of land-based plants producing significant amounts of biomass include cereal grains (including corn), grasses, sugar cane, trees, and the like. Particularly preferred are those parts of land-based plants that are by-products of agricultural or forestry activities, such as straw, corn husks, corn stalks, wood chips, saw dust, bagasse, and the like. It is an attractive aspect of the present invention that such materials may be used without requiring any previous refining step.

A preferred embodiment of the present invention is a composition based on unrefined, or "virgin" polymeric material of photosynthetic origin. It will be understood that the material may be subjected to a drying and/or a particle size reduction step. Such a drying and/or a particle size reduction step does not significantly change the relative composition of the biomass in terms of cellulose, hemicellulose and/or lignin and therefore such a step is not considered a refining step within the context of the present invention.

A dried and/or ground material is therefore considered unrefined or virgin.

The term "inorganic" as used herein refers to materials that are not "organic". The term "organic" is used for compounds that contain at least one C—H and/or at least one C—C bond. According to this definition, the oxalates are organic materials, as are graphite and the formates. Carbonic acid and the carbonates, on the other hand, are inorganic.

In a preferred embodiment, the inorganic material is present in a crystalline or quasi-crystalline form.

The inorganic material may be an inert material, or it may be a material having catalytic properties. Examples of inert materials include inorganic salts, in particular the salts of alkali and alkaline earth metals. Although these materials do not contribute to a subsequent chemical conversion of the polymeric material, it is believed that the formation of discrete particles of these materials within the biomass works as a wedge and results in a mechanical breakup or opening of the structure of the biomass. As a result of this opening of the structure, the biomass particles become more accessible to microorganisms and or chemicals used in the subsequent conversion. This mechanical wedge effect is particularly strong if the particles are in crystalline or quasi-crystalline form.

In a preferred embodiment, the inorganic particles have catalytic properties. These materials provide a mechanical breakup, similar to inert inorganic materials. In addition, these materials provide catalytic properties that accelerate the subsequent selective chemical conversion of the polymeric material. By being embedded in the polymeric material, the catalytic particles are in intimate contact with the polymeric material to be converted. Accordingly, the catalytic effect is enhanced as compared to a simple mechanical mixture of the polymeric material with catalytic particles.

Examples of inorganic materials having catalytic properties include metal oxides and hydroxides, in particular alumina; silicas, silica aluminas clays; zeolites; and ionic clays; cationic layered materials; LDHs; smectites; saponites; sepiolites; metal hydroxyl salts and the like. The carbonates and the hydroxides of alkali metals, and the oxides, hydroxides and carbonates of alkali earth metals also have catalytic properties. It will be understood that mixtures of these materials may also be used.

The inorganic particles embedded in the polymeric materials generally have an average particle size in the range of from 10 micrometers to 100 nanometers, preferably in the range of from 500 to 150 nanometers. In another embodiment, the inorganic particles embedded in the polymeric materials generally have an average particle size in the range of from 40 micrometers to 50 nanometers, preferably in the range of from 500 to 150 nanometers. Particles smaller than 100 nm may have a greater catalytic activity. However, the wedge function of such particles is generally less effective, and the preparation of particles of such a small size requires more energy. Also, particles smaller than 100 nm are difficult to separate from product streams as produced in further processing of the compositions of the present invention. As a practical matter particles larger than 50 nm are preferred for use herein, more preferably larger than 100 nm.

The term "embedded" as used herein refers to a penetration of the inorganic particles into the polymeric material or onto its surface, such that the inorganic particles are in close contact with cellulose fibers within the polymeric material. This can be demonstrated, for example, by scanning electron microscopy (SEM). SEM pictures taken at a magnification such that individual inorganic particles can be identified. If SEM pictures taken at this magnification show inorganic particles in contact with cellulose fibers, the inorganic particles are considered embedded within or onto the polymeric material.

The compositions of the present invention may be prepared by grinding biomass material in the presence of a particulate inorganic material. Or it may be prepared by soaking the biomass material with a solution of a precursor of the solid inorganic material, and then in situ converting the precursor to the solid inorganic material.

Grinding may be done in any suitable grinding equipment. It will be understood that the biomass material is relatively soft as compared to the inorganic material, in particular if the inorganic material is in crystalline form. Grinding the two materials together will therefore readily produce the composition of the invention, without requiring a very high energy input. Suitable grinders include ball mills, kneaders, pulverizers, and the like. A particularly preferred grinding method comprises contacting biomass particles with a fluid bed of the particulate inorganic material. It has been demonstrated that significant improvements in kinetics of co-crystal formation by grinding can be achieved by the addition of minor amounts of appropriate solvent. (See article by Shan, Toda and Jones in *CHEM. COMMUN.*, 2002, 2372-2373. The same holds for the formation of biomass imbedded with inorganic particulates. Suitable solvents include polar solvents such as water, alcohols, organic acids, and the like.

Grinding and milling can be further improved making use of ultrasound. Ultrasonification is an efficient means for the wet-milling and grinding of particles. Besides dispersing and deagglomerating, the wet milling is an important application of ultrasonic devices. The use of ultrasound has many advantages when compared with common size reduction equipment, such as: colloid mills (e.g. ball mills, bead mills), disc mills, torus mills, jet mills, rotor-stator mixers (ultra turrax) or high-pressure homogenizers. Ultrasonification allows for the processing of high-concentration and high-viscosity slurries—therefore reducing the volume to be processed. Ultrasonic milling is especially suited to process micron-size and nano-size materials, such as ceramics, alumina trihydrate, barium sulfate, calcium carbonate, metal oxides. Ultrasonic devices are very easy to install and to operate.

The in situ method generally comprises the steps of:

a) soaking a polymeric material of photosynthetic origin with a solution of a precursor of a solid inorganic material in a suitable solvent;

b) converting said precursor to the solid inorganic material.

More specifically, the compositions of matter of the present invention may be prepared as follows:

a. contacting a polymeric material of photosynthetic origin with a solution of precursor material to the inorganic particles in a suitable solvent under conditions permitting the solution to penetrate the polymeric material;

b. allowing the solution to penetrate the polymeric material;

c. modifying the conditions to cause the formation of inorganic particulate material from the precursor material.

The term "precursor material to the inorganic particles" as used herein means a material that is soluble in a suitable solvent and that can be converted to the inorganic particles. This term includes the inorganic material per se in a solution, such that inorganic particles may be formed by precipitation and or crystallization. The term also includes solutions of materials that may be converted to inorganic particles by chemical reaction. For example, alumina may be formed by reacting a soluble aluminum salt with a source of hydroxyl ions, or an acid salt (like alumina sulfate) with a basic salt (like sodium aluminate)

A suitable solvent is any solvent that dissolves the precursor material and that is compatible with the desired subsequent conversion of the precursor material to the inorganic particles. Water is an example of such a suitable solvent, and is in many cases preferred because of its low-cost and its ease of handling and its high safety. However, other solvents may be preferred for their specific properties. For example, lower alcohols such as methanol and ethanol have a much lower heat of evaporation than water and may therefore be preferred under certain circumstances. Such solvents may be relatively abundant, which lowers their costs. For example, ethanol is produced in large quantities from sugar. As a result, sugar plantations may have ethanol available at a relatively low-cost. Other solvents may be produced as a byproduct in the subsequent treatment of the biomass. Examples include phenols, other alcohols, and carboxylic acids. These solvents will be abundantly available at the site where conversion of biomass takes place, which makes them a desirable solvent for use in the present invention.

To aid penetration of the solvent, a swelling agent may be added. Suitable swelling agents include bases and acids as well as organic swelling agents. It will be understood that, if the solvent comprises an acid, such as a carboxylic acid, it is not desirable to use a base for a swelling agent. In this case, acids are preferred swelling agents.

In general, it is desirable to provide a high concentration of precursor material in the solution. Care should be taken however to avoid premature precipitation of its inorganic material. Therefore, it is advantageous to utilize concentrations that are near, but safely below, the saturation concentration of the precursor material in the solvent.

The solution comprising the precursor to the inorganic particles is contacted with the polymeric material of photosynthetic origin. To ensure an intimate contact of the solution with the polymeric material, it is preferred to provide the polymeric material in a small particles size. Preferably, the polymeric material is presented in the form of particles having an average particles size of less than 1 mm, more preferably less than 100 micrometers, even more preferably less than 50 micrometers. The particles may be as small as one micrometer, but it is in general not necessary to provide particles smaller than about 10 micrometers. Processes for reducing the size of biomass particles, which are relatively soft, are well-known and are not part of the present invention.

After contacting the biomass particles with the solution containing the precursor to the inorganic particles, the solution is allowed to penetrate the biomass particles. The time required for this penetration depends on the average particle size of the biomass particles, the viscosity of the precursor solution, the specific solvent used, the water content of the biomass particles, and the temperature at which the penetration takes place. In general, the penetration can be accelerated by slowly agitating the mixture of biomass particles and precursor solution and/or by raising the temperature. Typically, the penetration time ranges from several minutes to several hours.

The biomass particles may be contacted with a solvent (for instance water) prior to the introduction of the inorganic additives. Said pre-treatment may contain an acid or a base or a swelling agent.

After the solution has been allowed to penetrate the biomass particles, it may be desirable to drain off any excess solution, in particular if evaporation of the solvent is involved in the precipitation/crystallization step. It is preferable, however, to use an amount of solution such that virtually all of it is soaked up by the biomass particles. In this way, maximum penetration is achieved, while the need to drain off excess solution or to remove solvent by any other means is avoided.

In the next step, the conditions are changed such as to initiate precipitation or crystallization of the inorganic material within the particles of polymeric material. Depending on the type of inorganic material, precipitation or crystallization may be initiated by (partially) evaporating the solvent; by changing the pH; by changing the temperature; or by a combination of these measures. For example, crystallization of an alkali metal salt or an earth alkali metal salt may be triggered by evaporation of the solvent, or by a lowering of the temperature. By way of other example, an insoluble hydroxide may be formed by raising the pH of a solution of the appropriate metal cation.

A specific class of materials according to present invention are polymeric materials of photosynthetic origin having embedded therein small particles of inorganic materials. Examples of suitable inorganic materials include metal oxides, metal hydroxides, metal salts and inorganic in-situ formed compounds or natural occurring compounds, alumina, zirconia, titania, silica, and alumina silica, magnesia, magnesia-alumina, magnesia-silica, magnesia-silica-alumina, manganese compounds, calcium compounds, lime, and the like.

A specific class of useful low cost materials are natural clays and/or treated and activated forms thereof. Also naturally occurring salts like NaCl, $Na_2CO_3$. Spent chemicals like NaCl from brine and cracking catalysts from oil processing may also be used if not too heavily contaminated with heavy metals.

A method for preparing a cellulose-containing polymeric material having embedded therein microcrystalline particles of an inorganic material, said method comprising the steps of:
  a. providing a cellulose-containing polymeric material, such as biomass;
  b. providing an aqueous solution of the cation of a metal capable of forming a particulate inorganic compound;
  c. soaking the cellulose polymeric material with the aqueous metal solution;
  d. initiating precipitation of a precursor to a metal oxide or hydroxide particulate inorganic compound;
  e. optionally, aging to convert the precursor to the particulate inorganic compound.

This method is particularly suitable for embedding oxides, such as alumina, silica, silica-alumina, magnesia-alumina, silica-magnesia, silica-magnesia-alumina, and the like.

The preparation of such materials is exemplified herein for alumina containing materials. The skilled person will be able to make the necessary adjustments to prepare materials containing other particulate inorganic compounds.

Cellulose containing material, such as biomass, is ground to a particles size of about 50 micrometers. The material is contacted with an aqueous solution of an aluminum source. The aluminum may be present in the form of $Al^{3+}$, as in $AlCl_3$, or as an aluminate, for example sodium aluminate. The aqueous solution is allowed to penetrate the biomass particles during about 30 minutes. After the penetration step, if an acid aluminum salt is used, the pH of the solution is raised to about 10 by adding a base. The basic solution is allowed to penetrate the biomass particles during about 30 minutes. The resulting slurry is then aged at elevated temperature for several hours, after which excess liquid is drained off and the biomass particles are dried. X-ray diffraction confirms the presence of crystalline alumina. In case a basic aluminum salt is used, precipitation may be triggered by lowering the pH by addition of an acid.

Another specific class of materials according to the present invention are polymeric materials of photosynthetic origin having embedded therein small particles of a mixed oxide, a divalent metal and a trivalent metal. The preparation of these materials is similar to that described hereinabove for alumina containing polymeric materials, as follows:

A method for preparing a cellulose-containing polymeric material having embedded therein microcrystalline particles of an inorganic material, said method comprising the steps of:

a. providing a cellulose-containing polymeric material, such as biomass;

b. providing an aqueous solution of a divalent metal and a trivalent metal;

c. soaking the cellulose polymeric material with the aqueous solution;

d. initiating precipitation of a crystalline inorganic material;

e. optionally aging

The aqueous solution of the divalent and the trivalent metal may be provided by dissolving a soluble salt. It is also possible to dissolve metal ions by subjecting an insoluble material containing the desired metal to electrolysis. An example is subjecting a clay suspension to electrolysis to dissolve metal ions contained in the clay. The electrolysis is preferably carried out in the presence of the polymeric material in which the metal is to become embedded.

The method will be illustrated herein with the preparation of biomass particles having embedded therein small particles of hydrotalcite. The skilled person will be able to modify the conditions for preparing other particulate inorganic compounds, including hydrotalcite-like anionic clays and metal hydroxyl salts.

Biomass particles of about 50 micrometers in diameter are soaked with an aqueous solution comprising aluminum ions and magnesium ions. The aqueous solution is allowed to penetrate the biomass particles for about 45 minutes. After penetration, the pH is raised to about 9 by the addition of a base. The base solution is allowed to penetrate for about 30 minutes. The particles are then aged at elevated temperature for about three hours. X-ray diffraction confirms the presence of hydrotalcite crystals.

Another embodiment involves the pre-treatment of the biomass particle with a base or an acidic solution before the inorganic additive is introduced or formed.

The materials of the present invention are particularly suitable for conversion to liquid or gaseous fuels, or as a source of valuable specialty chemicals. The presence of the inorganic particles embedded within the polymeric material makes the polymeric material more susceptible to conversion than the corresponding unmodified polymeric material.

A specific example of conversion of a material of the present invention involves fermentation of cellulose or lignocellulose present in the polymeric material. In its untreated form, the polymeric material contains large amounts, typically about 50 percent, of cellulose that is not accessible to the microorganisms used for the fermentation reaction. This fraction of the cellulose is referred to as recalcitrant cellulose. As a result of the small inorganic particles embedded in the biomass, a greater fraction of the available cellulose is accessible to the microorganisms used for the fermentation reaction. In other words, the amount of recalcitrant cellulose is reduced as result of the presence of the inorganic particles. Consequently, the yield of the fermentation reaction is increased, and the production of unfermentable cellulosic byproduct is reduced, and in some cases all but eliminated.

Conversion of the materials of the present invention may also be accomplished by hydrothermal treatment. Because of the presence of the inorganic particles, such hydrothermal treatment may be carried out at conditions that are milder than are typically used for conversion of biomass to bio-oil. The hydrothermal treatment may result in a certain degree of defibrillation of the biomass, in combination with a certain degree of hydrolysis of the polymers present in the biomass.

In addition to being suitable as an intermediate material in the preparation of a bio-oil, the materials may be used for other purposes, for example as a binder or as a construction material.

Example 1

A. Sepiolite

A polymeric material having embedded therein small particles of Sepiolite clay is prepared as follows.

Step 1

A suspension of partly dissolved Sepiolite clay is produced by slurrying the clay with an aqueous solution of hydrochloric acid.

Step 2

Subsequently this suspension is contacted and mixed with wood particles having a particle size distribution in the range of from 1 micrometer to 100 micrometers. The particles are thoroughly soaked in the suspension of Step 1 for about 60 minutes.

Step 3

Next the pH of the suspension formed in Step 2 is increased by the addition of NaOH. As a result, part of the dissolved Sepiolite clay re-crystallizes in the interior of the solid biomass. The presence of the crystalline clay particles is confirmed with X-ray diffraction and microscopy (SEM/TEM).

The example is repeated using sulfuric acid, nitric acid, acetic acid and formic acid, respectively, for dissolving or partly dissolving the clay in step 1. Similar results are obtained.

The example is repeated using KOH, $NH_4OH$, and urea, respectively, for increasing the pH in step 3. Similar results are obtained.

The example is repeated, except that the pH change in step 3 is accomplished by adding further amounts of clay. Similar results are obtained.

The polymeric material having embedded therein clay particles is gently heated in an autoclave at 180° C. and autogenous pressure for about 30 minutes. A bio-oil rich in oxygen-containing organic compounds is obtained.

B. Hydrotalcite

The above experiment is repeated, but using hydrotalcite instead of sepiolite clay. The resulting material comprises wood particles having embedded therein small particles of hydrotalcite.

The example is repeated, except that the hydrothermal treatment of step 3 is carried out at 140 and 220° C., respectively.

Hydrotalcite is formed in situ as follows.

Step 1

A Mg—Al solution is prepared by dissolving $MgCl_2$ and $AlCl3$ in water.

Step 2

Subsequently this solution is contacted and mixed with straw particles. The particles are thoroughly soaked with the solution of Step 1 for 30 minutes.

Step 3

Next the pH of the suspension formed in Step 2 is increased, by the addition of NaOH in order to precipitate the mixed Mg—Al hydroxide.

Step 4

The resulting slurry is aged at 85° C. for 6 hours with agitation in order to convert the precursor Mg—Al hydroxide into a particulate inorganic compound.

Step 5

After aging, the presence of crystalline particles of hydrotalcite is confirmed by x-ray diffraction and microscopy (SEM/TEM).

Step 6

The polymeric material having embedded hydrotalcite is heated in an autoclave at 180° C. and autogenous pressure for about 30 minutes. A bio-oil rich in oxygen-containing organic compounds was obtained.

Example 2

Step 1

A solution of $MgCl_2$ is prepared by dissolving $MgCl_2$ in water.

Step 2

Subsequently this solution is contacted and mixed with straw particles. The particles are thoroughly soaked with the solution of Step 1 for 30 minutes.

Step 3

Next the pH of the suspension formed in Step 2 is increased, by the addition of NaOH. As a result, part of the Mg re-crystallizes in the form of MgO and $Mg(OH)_2$ in the interior of the solid biomass. The presence of crystalline particles is confirmed by X-ray diffraction and microscopy (SEM/TEM).

The example is repeated with biomass particles obtained from wood, corn husks, bagasse, and algae, respectively. Similar results are obtained.

Example 3

Step 1

A solution of $MgCl_2$ is prepared by reacting $Mg(OH)_2$ with an aqueous solution of HCl.

Step 2

Subsequently this solution is contacted and mixed with solid organic biomass particles. The particles are thoroughly soaked with the solution of Step 1. The uptake of moisture is monitored by measuring the loss on ignition (LOI) of the soaked particles and by chemical analysis, monitoring the concentration of the inorganic material in the solution. The soaking is considered completed when no significant change is recorded in the measured LOI after a 10-minute interval. Base is added to cause precipitation of the Mg.

Step 3

Next the suspension formed in Step 2 is partly dried. As a result, part of the Mg re-crystallizes in the form of an amorphous Mg material and/or $Mg(OH)_2$ (brucite) in the interior of the solid biomass. The presence of crystalline material is confirmed with X-ray diffraction and microscopy (SEM/TEM).

Step 4

The material produced under Step 3 is heated under atmospheric conditions to a temperature of 250° C. Part of the solid biomass is converted to a liquid biomass (bio-oil).

Step 5

The liquid bio-oil produced in Step 4 is separated from the residual solid. The residual solid biomass is burned off. The heat energy produced is used for the hydrothermal treatment of additional Mg-containing biomass. The ashes, which are rich in MgO, are dissolved in dilute acid, and re-used in Step 1.

The example is repeated, except that the hydrothermal treatment of step 4 is carried out at 200, 300, and 400° C., respectively.

The example is repeated at 200, 300 and 400° C. and autogenic pressure. The conversion of Mg-containing biomass to bio-oil proceeds more rapidly than that of untreated biomass. The conversion of solid biomass to bio-oil increases with increasing temperature and increasing pressure.

Example 4

Step 1

A solution of $FeCl_3$ is prepared by dissolving $FeCl_3$ in water.

Step 2

Subsequently this solution is contacted and mixed with a solid organic biomass comprised of wood and/or straw particles. The particles are thoroughly soaked with the solution of Step 1 until no further solution is absorbed, as determined by LOI and by chemical analysis, monitoring the concentration of the inorganic material in the solution (see Example 3).

Step 3

Next, the pH of the suspension formed in Step 2 is increased, by the addition of NaOH. As a result, part of the Fe re-crystallizes in the form of $Fe_2O_3$ and $Fe(OH)_3$ in the interior of the solid biomass. The presence of crystalline material is confirmed by X-ray diffraction and microscopy (SEM/TEM).

Step 4

The material produced under Step 3 is subjected to hydrothermal treatment as described in Example 3, leading to the conversion of part of the solid biomass to a liquid biomass (bio-oil).

Step 5

The liquid bio-oil as produced in Step 4 is separated from the solid. The residual solid biomass is burned off, and the heat energy produced is used for hydrothermal treatment of additional Fe-containing biomass. The ashes, which are rich in $Fe_2O_3$, are dissolved in acid and recycled to Step 1.

Example 5

Saw dust of Canadian pine was ground in a planetary mono mill Pulverisette to a particle size of about 1 micrometer. A slurry was prepared of 12% w/w saw dust in water. The slurry was heated at 180° C. for 1 hour under stirring in a 2 ml closed vial provided with a magnetic stirrer.

FIG. 1 is a SEM picture of the saw dust sample after the heating step.

The experiment was modified by adding 3% w/w of hydrotalcite powder (ESM-350 from Eurosupport Manufacturing, calcined at 650° C.).

Figure 2:
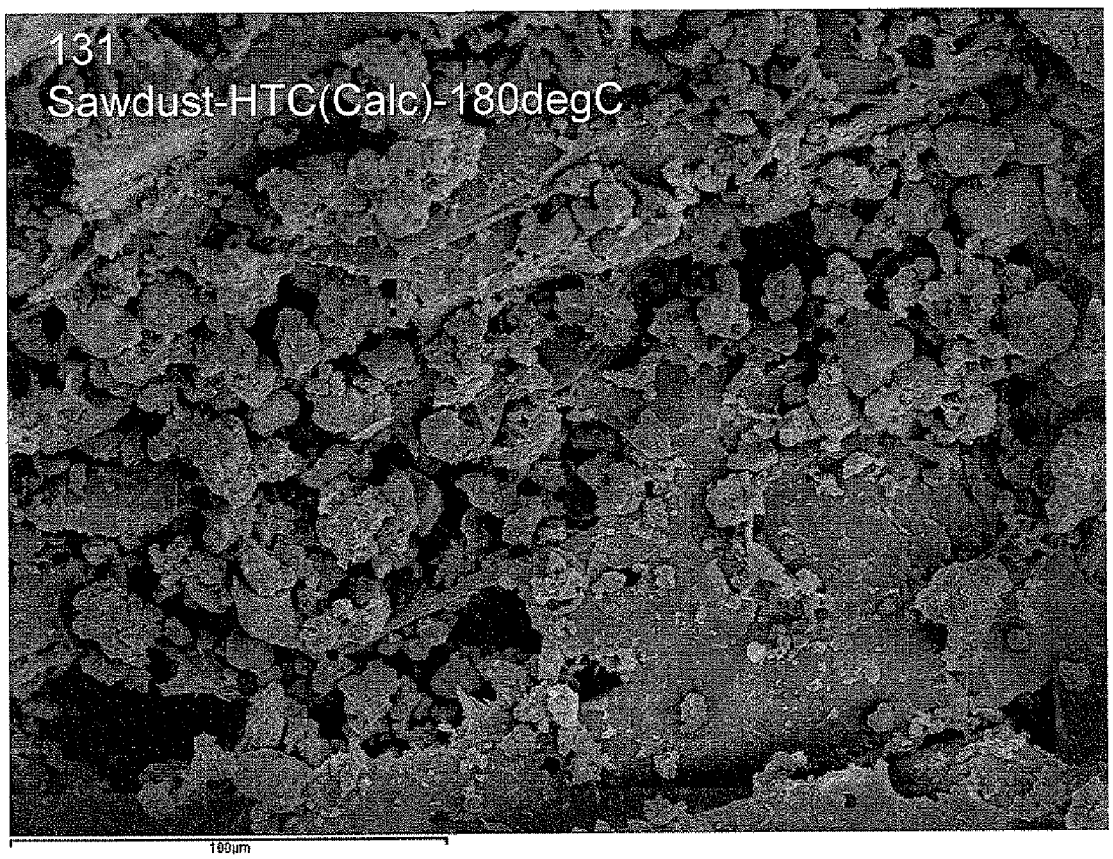
FIG. 2 is a SEM picture of a wood sample having embedded therein particles of hydrotalcite.

FIG. 2 is a SEM picture of the pine material after heating for 1 hour at 180° C. with hydrotalcite. The hydrotalcite particles are visible as the lighter color particles. The hydrotalcite particles are in direct contact with the cellulose fibers.

Figure 3:
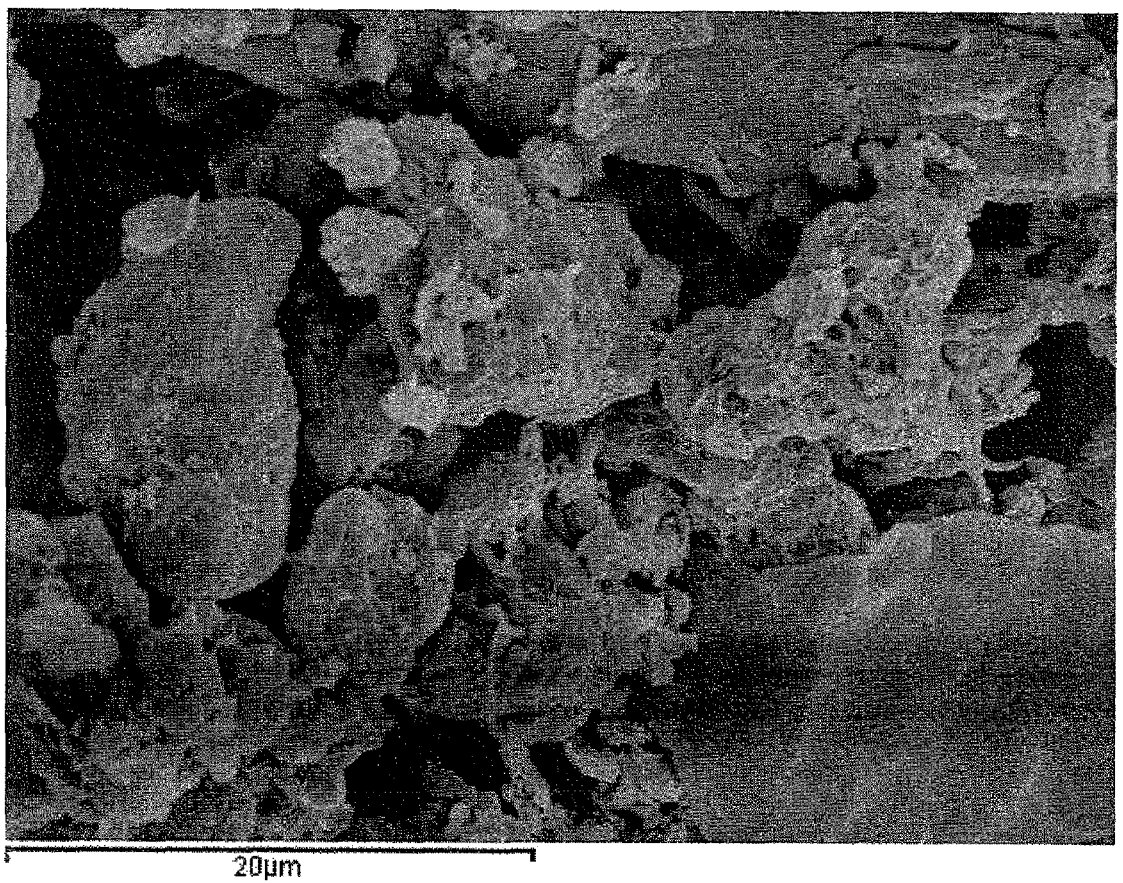
FIG. 3 is a SEM picture of the material of FIG. 2, at a different magnification.

FIG. 3 is a SEM picture of the same material as that of FIG. 2, taken at a somewhat greater magnification, such that the size of the hydrotalcite particles is about one fifth of the longer axis of the picture. At this magnification the hydrotalcite particles are clearly shown in contact with the cellulose fibers. The hydrotalcite particles are considered embedded within the polymeric material within the meaning of this term as it is used in this document.

Example 6

A Composition preparation by co-grinding a biomass material and an inorganic particulate material. Saw dust of Canadian pine is ground in a planetary mono mill Pulverisette in the presence of a particulate magnesium carbonate. The weight ratio saw dust/$MgCO_3$ is 80/20. The materials are ground together for 120 minutes. The XRD confirms the presence of cellulose and an inorganic phase and the SEM confirms that the inorganic particles are embedded within the polymeric material within the meaning of this term as it is used in this document.

Example 7

A composition preparation by co-grinding a biomass material and an inorganic particulate material. Saw dust of Canadian pine is ground in a planetary mono mill Pulverisette in the presence of a particulate magnesium oxide and a sodium carbonate. The weight ratio saw dust/inorganics is 80/10/10. The materials are ground together for 120 minutes. The XRD confirms the presence of cellulose and an inorganic phase and the SEM confirms that the inorganic particles are embedded within the polymeric material within the meaning of this term as it is used in this document.

Example 8

A composition preparation by co-grinding a biomass material and an inorganic particulate material. Saw dust of Canadian pine is ground in a planetary mono mill Pulverisette in the presence of a particulate Zinc-Alumina LDH. The weight ratio saw dust/Zn—Al is 80/20. The materials are ground together for 120 minutes. The XRD confirms the presence of Cellulose and an inorganic phase and the SEM confirms that the inorganic particles are embedded within the polymeric material within the meaning of this term as it is used in this document.

Example 9

Same as example 8, whereby 2% and 5% of a solvent is added: water, ethanol and formic acid.

What is claimed is:

1. A composition of matter comprising a polymeric material of photosynthetic origin having embedded therein particles of an inorganic material, wherein the polymeric material comprises unrefined particulate biomass having a particle size of at least 1 micrometer, wherein the particles of inorganic material have an average particle size in the range of from 40 micrometers to 50 nanometers, wherein the inorganic material is selected from clays, silicas, silica-aluminas, transition metal hydroxides, metal hydroxyl salts, zeolites, cationic layered materials, anionic clays, layered double hydroxides, smectite clays, saponites, sepiolites, and mixtures thereof, wherein the unrefined particulate biomass comprises lignocellulose.

2. The composition of matter of claim 1 wherein the inorganic material is in crystalline or quasi-crystalline form.

3. The composition of claim 1 wherein the particles of inorganic material have an average particle size in the range of from 10 micrometers to 100 nanometers.

4. The composition of claim 1 wherein the inorganic material is an inert inorganic material.

5. The composition of claim 1, wherein the inorganic material has catalytic properties.

6. The composition of claim 1 for use in the preparation of a bio-oil.

7. The composition of claim 1 for use as a binder.

8. The composition of claim 1 for use as a construction material.

9. The composition of claim 1 wherein the unrefined particulate biomass has a particle size distribution in the range of from 1 micrometer to 100 micrometers.

10. A method for preparing a polymeric material having embedded therein particles of an inorganic material comprising the steps of:
   a. contacting a polymeric material of photosynthetic origin with a solution of precursor material to the inorganic particles in a suitable solvent under conditions permitting the solution to penetrate the polymeric material;
   b. allowing the solution to penetrate the polymeric material;
   c. modifying the conditions to cause the formation of inorganic particulate material from the precursor material, wherein the polymeric material comprises unrefined particulate biomass having a particle size of at least 1 micrometer, wherein the particles of inorganic material have an average particle size in the range of from 40 micrometers to 50 nanometers, wherein the unrefined particulate biomass comprises lignocellulose.

11. The method of claim 10 wherein the solvent comprises water.

12. The method of claim 11 wherein the solvent further comprises a swelling agent.

13. The method of claim 10 wherein the solvent comprises an alcohol.

14. The method of claim 10 wherein the solvent comprises a carboxylic acid.

15. The method of claim 10, wherein the modification of conditions in step c) comprises a change in temperature, a change in pH, evaporation of the solvent, or a combination thereof.

16. The method of claim 10, wherein the inorganic material is in crystalline or quasi-crystalline form.

17. A method for preparing a cellulose-containing polymeric material having embedded therein microcrystalline particles of an inorganic material, said method comprising the steps of
   a. providing a cellulose-containing polymeric material;
   b. providing an aqueous solution of a divalent metal and a trivalent metal;
   c. soaking the cellulose polymeric material with the aqueous solution;
   d. initiating precipitation of a crystalline inorganic material,
   wherein the polymeric material comprises unrefined particulate biomass having a particle size of at least 1 micrometer,
   wherein the unrefined particulate biomass comprises lignocellulose.

18. The method of claim 17 wherein the divalent metal is Mg.

19. The method of claim 17 wherein the trivalent metal is Al.

20. The method of claim 17 wherein the crystalline inorganic material is an anionic clay.

21. The method of claim 20 wherein the anionic clay is hydrotalcite.

22. A method for preparing a cellulose-containing polymeric material having embedded therein microcrystalline particles of an inorganic material, said method comprising the steps of
   a. providing a cellulose-containing polymeric material;
   b. providing an aqueous solution of a cation or anion of a metal capable of forming a particulate inorganic compound;
   c. soaking the cellulose polymeric material with the aqueous solution;
   d. initiating precipitation of a precursor to a particulate inorganic compound;
   e. aging to convert the precursor to the particulate inorganic compound,
   wherein the polymeric material comprises unrefined particulate biomass having a particle size of at least 1 micrometer,
   wherein the unrefined particulate biomass comprises lignocellulose.

23. The process of claim 22 wherein the cation of step b. is $Al^{3+}$.

24. The process of claim 22 wherein the anion of step b. is $Al_2O_4^{2-}$.

* * * * *